United States Patent [19]
Wallington

[11] 3,769,135
[45] Oct. 30, 1973

[54] BASE SEALER METHOD

[75] Inventor: Frederick L. Wallington, Perrysburg, Ohio

[73] Assignee: Owens-Illinois, Inc., Toledo, Ohio

[22] Filed: Jan. 18, 1972

[21] Appl. No.: 218,702

Related U.S. Application Data

[62] Division of Ser. No. 57,200, July 22, 1970, Pat. No. 3,695,980.

[52] U.S. Cl................................ 156/306, 156/359
[51] Int. Cl.. ................ C09j 5/00, B32b, 31/00
[58] Field of ................156/306, 583, 580, 359

[56] References Cited
UNITED STATES PATENTS
3,101,898 8/1963 Mader, Jr. ..................... 156/359

Primary Examiner—Douglas J. Drummond
Attorney—J. R. Nelson et al.

[57] ABSTRACT

Method for sealing vent openings in the bottom of plastic base elements of composite containers. A series of heated sealing tips are linked together into an endless chain and driven along an endless path having one run which extends above a conveyor upon which the composite containers are conveyed in an inverted position. During their transit of this one run, the tips are engaged with the base elements to heat seal the vent openings. Regulation of the amount of heat applied to the base elements is achieved by maintaining the tip temperature within a predetermined range and contacting the tip and base element for a fixed time interval. The method includes a control over maintaining the contact time between tip and base element constant regardless of the conveyor speed.

3 Claims, 8 Drawing Figures

BASE SEALER METHOD

This application is a division of copending application Ser. No. 57,200, filed July 22, 1970, issued as U.S. Pat. No. 3,695,980.

RELATED PATENTS AND APPLICATIONS

The composite container referred to in this application may take the form of the composite containers which are the subject of U.S. Pat. No. 3,372,826. The apparatus of this application is employed in conjunction with the container assembly machine which forms the subject matter of U.S. Pat. No. 3,630,797.

BACKGROUND OF THE INVENTION

Composite containers of the type disclosed in the aforementioned U.S. Pat. No. 3,372,826 consist of a bulb shaped glass container having a hemispherical bottom and a cup-shaped plastic base element which is bonded to the container to provide stability. In the assembly of the cup-shaped base element onto the bottom of the glass containers, it is necessary to vent the interior of the plastic base element through its bottom to permit the escape of air trapped between the glass container bottom and the interior of the cup-shaped base element. Thus, vent openings are formed in the base element bottom. Subsequent sealing of these openings is necessary in order to prevent liquid from getting into the dead air space in the interior of the plastic base element when the containers are filled at the bottling plant. Liquid which finds its way into the interior of the base will cause mold or mildew, with a resultant unpleasant odor.

The purpose of the present invention is to provide a method for sealing these vent openings on the container production line.

SUMMARY OF THE INVENTION

The apparatus disclosed in the aforementioned U.S. Pat. No. 3,630,797 includes a pocket conveyor which conveys the assembled composite container in line in an inverted position along a first path. The present invention consists of what is essentially a second endless conveyor mounted on top of the pocket conveyor and driven in synchronism with the pocket conveyor. The conveyor of the present application includes a series of carriages linked together into an endless chain with a heated tip element mounted in each carriage and capable of movement in a direction normal to the endless path of the carriage. As the tip elements are moved along that portion of their path passing immediately above the pocket conveyor, the tip elements are supported upon a guide track which permits the heated tip elements to drop downwardly relative to their carriage into contact with the aligned base element being conveyed on the pocket conveyor. The heated tip element contacts the base element in the area encompassing the vent openings, melts the plastic of the base element to seal the openings, and is then elevated by an inclined track section clear of the base element.

Heating means are provided to maintain the tip elements at temperatures falling within a selected temperature range. With the top elements maintained within the given temperature range, the amount of heat transferred to the plastic base element can be maintained essentially constant by permitting the tip element to contact the base for a fixed interval of time. Because of the production line environment, the pocket conveyor may run at different speeds, and a constant time period of contact is achieved by shifting the inclined track longitudinally along the path of travel to vary the distance over which the tip and base element are maintained in contact in accordance with variations in line speed.

In view of the fact that the same production line may be changed over from bottles or containers of one given size to another, resulting in a difference in the container height, the entire base sealer is mounted upon the pocket conveyor so that it can be vertically adjusted as a unit to compensate for different bottle heights on different production runs.

Other objects and features of the invention will become apparent by reference to the following specifications and to the drawings.

IN THE DRAWINGS

GENERAL DESCRIPTION

Figure 1:
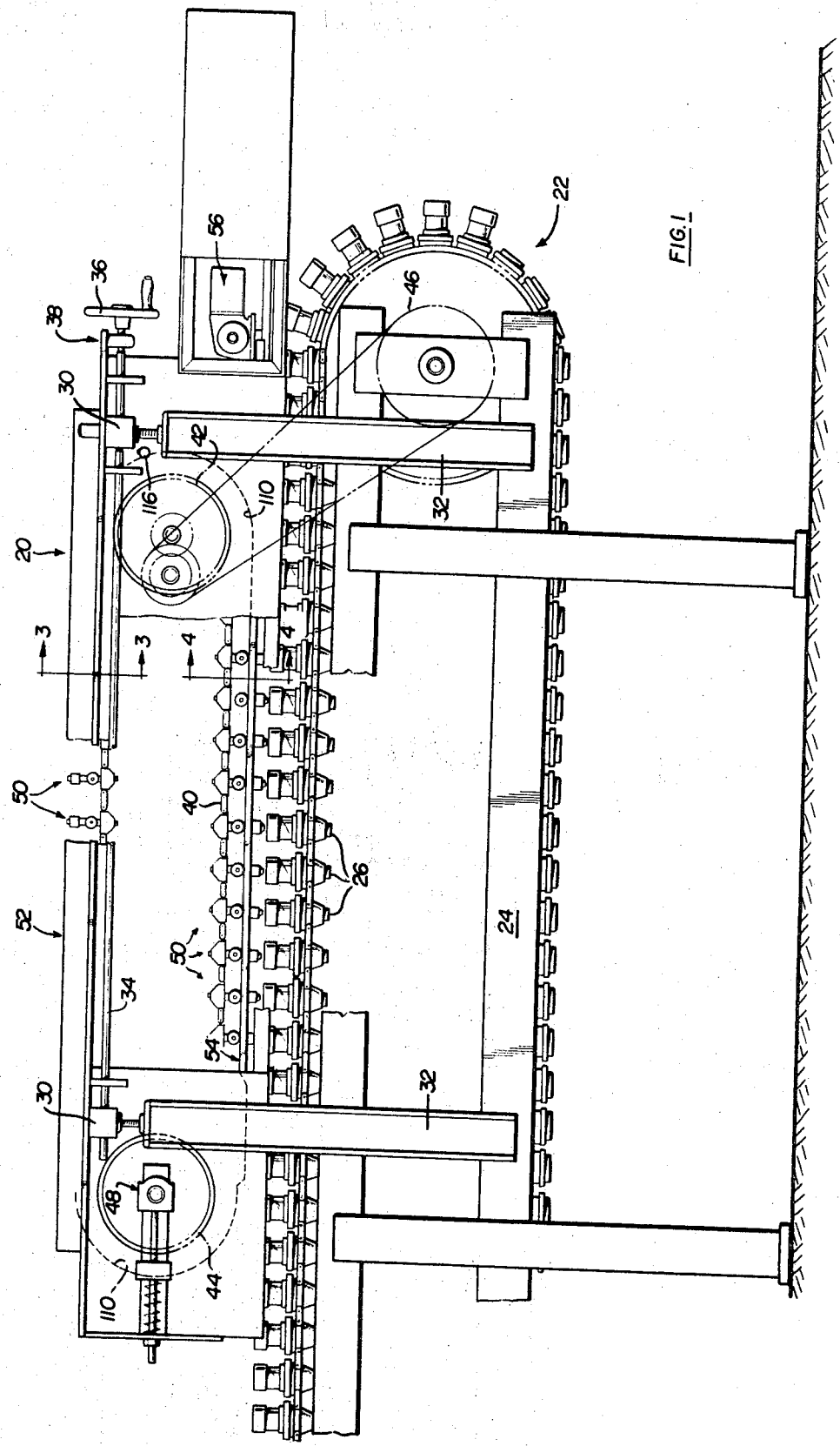
FIG. 1 is a side elevational view, with certain parts broken away or omitted for clarity, showing an apparatus embodying the present invention.
Figure 2:
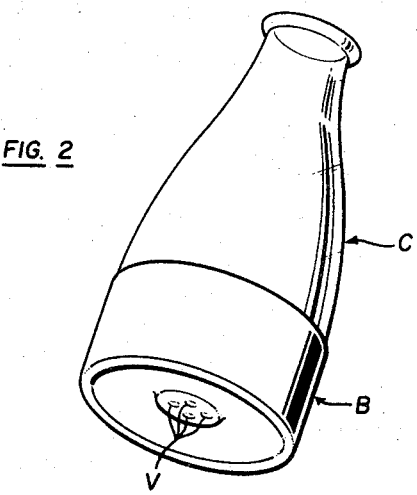
FIG. 2 is a perspective view of a composite container, showing the plastic base and vent openings which are sealed by the apparatus of the present invention.

In FIG. 1, a base sealer designated generally 20 embodying the invention is disclosed as being mounted upon the frame of an assembly machine pocket conveyor 22. Pocket conveyor 22 is described in detail in a commonly owned U.S. Pat. No. 3,630,797. In brief, pocket conveyor 22 includes a stationary frame 24 along which a plurality of container receiving pockets 26 are linked together into an endless chain and driven along a path defined by frame 24, with the upper run of the pocket chain moving from left to right as viewed in FIG. 1. As described in greater detail below, and in the aforementioned U.S. Pat. No. 3,630,797, each of the pockets 26 supports an inverted glass container C, shown in FIG. 2, which has a cup-shaped plastic base element B mounted upon its bottom. In order to vent air trapped between the container bottom and the interior of the cup-shaped plastic base element as the base element is being forced onto the container bottom, the bottom of the base element is formed with a vent opening or openings V, as shown in FIG. 2, and the function of the base sealer 20 is to seal these openings as the assembled containers and base elements are conveyed by conveyor 22 beneath base sealer 20. As shown in FIG. 1, pockets 26 support the assembled container and base element in an inverted position as they pass beneath base sealer 20 with the bottom of the base element facing upwardly toward the lower run of the base sealer 20.

Base sealer 20 includes a frame designated generally 28 which is supported by four screw-jack assemblies 30 respectively supported upon four support legs 32 fixedly mounted upon frame 24 of pocket conveyor 22. Only two of the screw-jacks 30 and support legs 32 appear in FIG. 1, the remaining pair being located on the side of the machine opposite the viewer in FIG. 1. Screw-jacks 30 are mechanically coupled to each other as by shaft 34 which is driven in rotation by a hand wheel 36 to simultaneously raise or lower jacks 30 to thereby adjust the elevation of base sealer 20 about pocket conveyor 22. A chain and sprocket designated generally 38 couples the shafts 34 on opposite sides of the machine so that all four jacks move in unison. The purpose of this capability of vertical adjustment is to enable the base sealer to accommodate bottles of different sizes.

Base sealer 20 includes a pair of endless roller chains 40 operatively trained around paired end sprockets 42 and 44. Sprocket 42 is a drive sprocket which is operatively connected to and driven from one of the end sprockets 46 of pocket conveyor 22 so that endless chains 40 of the base sealer move in synchronism with the pocket conveyor chain. End sprockets 44 are supported upon the base sealer frame 28 by a suitable chain take-up mechanism designated generally 48 so that the tension in chains 40 may be accurately regulated. Chains 40 support and carry between them a plurality of sealer units designated generally 50, the units 50 being spaced along chains 40 in a spacing corresponding to the spacing of pockets 26 on the pocket conveyor. Units 50 are initially aligned with pockets 26 so that each sealing unit 50 is operatively aligned vertically with the base element supported in a pocket 26 during movement of the sealing unit along the lower run of chain 40.

During the transit of the upper run of chain 40, sealing units 50 are exposed to a heating unit designated generally 52 which is automatically controlled to heat, in a manner to be described in greater detail below, the sealing unit so that the unit is within a predetermined temperature range as it passes around end sprockets 44 into operative engagement with the base element of a container supported in a pocket 26 on pocket conveyor 22.

In order to maintain a constant contact time between a given sealing unit 50 and the base element of a composite container, regardless of the line speed, an adjustable cam assembly designated generally 54 is employed. The cam is automatically positioned longitudinally along the lower run of chains 40 by a mechanism 56 which is automatically activated by a change in line speed.

SEALING UNIT

Figure 5:
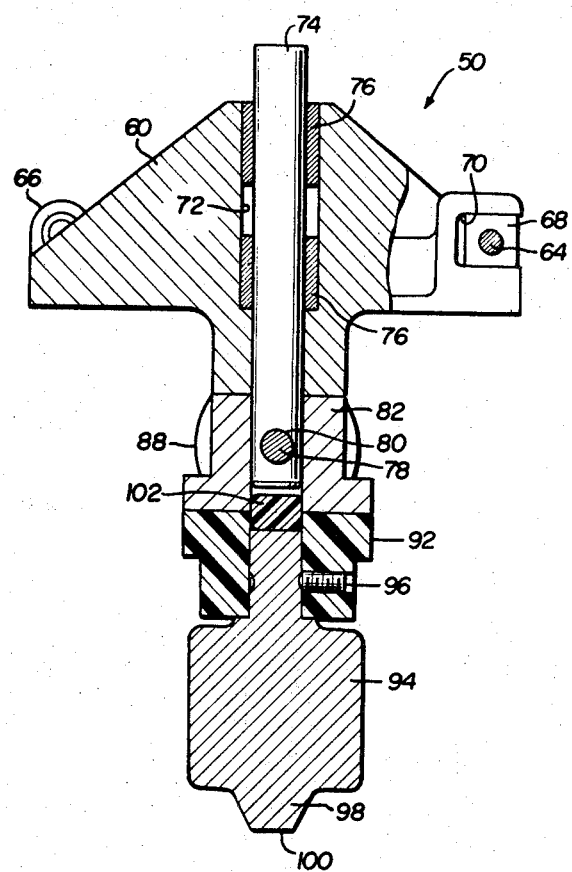
FIG. 5 is a detail cross-sectional view of the sealing unit.
Figure 3:
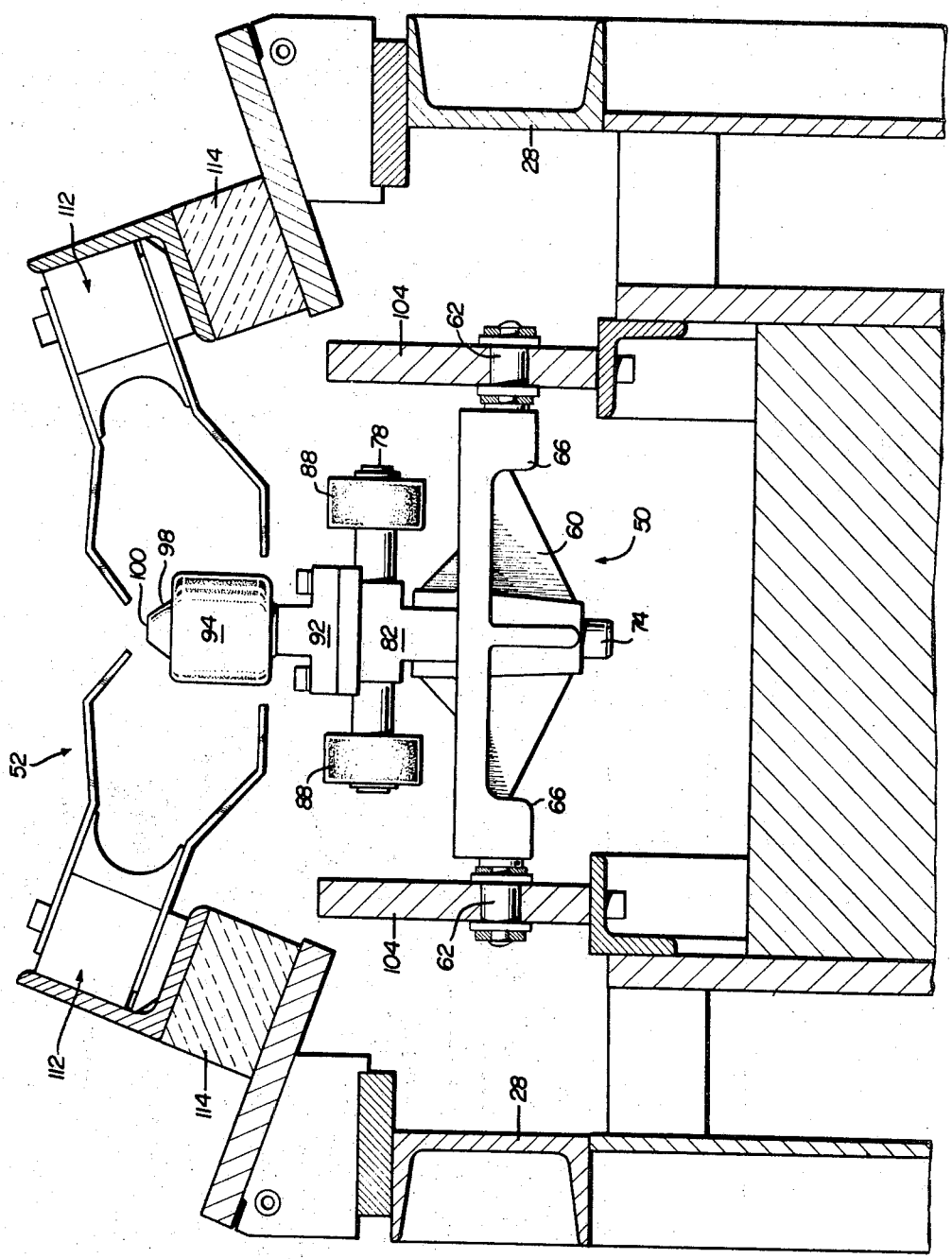
FIG. 3 is a transverse cross-sectional view of the apparatus of FIG. 1, taken on line 3—3 of FIG. 1.
Figure 4:
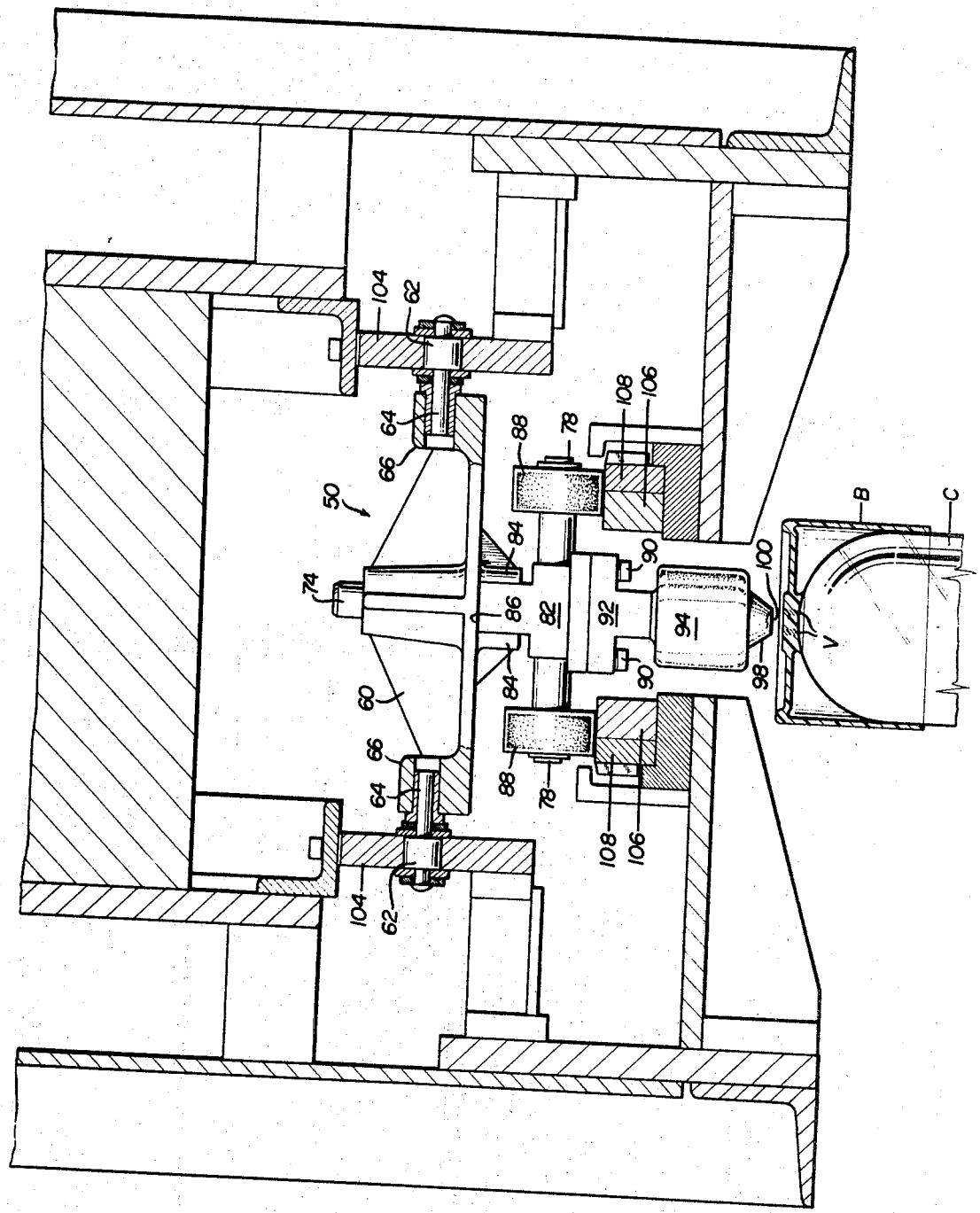
FIG. 4 is a detail cross-sectional view taken on line 4—4 of FIG. 1.

Details of the structure of sealing units 50 are best seen in FIGS. 3, 4 and 5. Each unit 50 includes a carriage 60 which is supported by and between a pair of roller chains 62 as by pins 64 mounted upon chains 62 and received within hubs 66 formed on the leading edge of carriage 60. At the trailing edge of carriage 60, the chain pins 64 are received within a slide block 68 which is slidably received within slits 70 formed in carriage 60 to accomodate for the difference in spacing when the chain is trained around the end sprockets as compared to the spacing where the chain is in a straight line.

Referring now particularly to FIG. 5, carriage 60 is formed with a centrally located vertical bore 72 within which is slidably received a vertical shaft 74 guided within bore 72 as by upper and lower bushings 76. Near its lower end, a transverse shaft 78 passes horizontally through a bore 80 in shaft 74 and also through a pair of horizontal bores formed in a shaft block 82. As best seen in FIG. 4, shaft block 82 projects upwardly between a pair of spaced parallel flanges 84 formed on the lower side of carriage 50, the flanges 84 engaging opposite flat sides of shaft block 82 to prevent shaft block 82 from rotating about the vertical axis of shaft 74, while at the same time permitting shaft block 82 to slide vertically relative to carriage 60.

In FIG. 4, the shaft block 82 is shown at its upper limit of travel relative to carriage 60, at which time the upper surface 86 of block 82 is seated against the lower surface of carriage 60.

Transverse shaft 78 couples shaft 74 and block 82 to each other and, as best seen in FIG. 4, projects transversely outwardly beyond opposite sides of block 82 to provide a rotary support for a pair of rollers 88.

Secured to the lower side of shaft block 82, as by bolts 90, is a second block 92 which is constructed of a material having good heat insulation properties. A relatively massive metal tip element 94 is in turn secured to block 92 as by a setscrew 96 (FIG. 5). The lower end of tip 94 is formed with a suitable shaped base element engaging portion 98 whose lower surface 100 is conformed in shape to the area of the plastic base element which will contain the vent openings to be heat sealed. To thermally insulate shaft block 82 and shaft 74 from tip element 94, a plug 102 of insulating material is positioned to overlie the top end of tip element 94.

When assembled into the apparatus, the various carriages 60 are linked together into an endless chain by the two roller chains 62. Roller chains 62 are supported and guided along an endless path of movement as by chain tracks 104 which are fixedly mounted in machine frame 28 to extend along and define the horizontal upper and lower runs of the endless path. As the carriages 60 pass around the end sprockets 42 and 44, support and guidance of chain 62 is transferred from the tracks to the respective sprockets.

As described above, shaft 74 is freely slidable within bore 72 of the carriage 60, and thus, except during transit of the upper run of the endless path, it is necessary to support and guide rollers 88 to prevent shaft 74 and the remaining elements of the tip assembly attached to shaft 74 from dropping out of carriage 60. During transit of the lower run of the endless path, rollers 88 are supported either upon a fixed track 106 or upon a movable track 108, the movable tracks 108 forming a portion of the adjustable cam assembly 54 referred to above. During transit around end sprockets 42 and 44, rollers 88 ride along a pair of curved end tracks 110 (FIG. 1).

As best seen in the upper portion of FIG. 3, the tip assemblies traverse the upper run of their endless path in an upsidedown position, and thus shaft 74 and its attached elements are held in position on their carriage 60 by gravity and it is not necessary to provide independent support for rollers 88.

HEATING ELEMENTS

The vent openings in the plastic base element are heat sealed by heating tip elements 94 to a predetermined temperature as the tip elements traverse the upper run of their endless path. The heating elements in the disclosed embodiment take the form of commercially available electric heat lamps designated generally 112 mounted to extend along substantially the entire length of the upper run of the endless path on opposite sides of the path. As best seen in the upper portion of FIG. 3, lamps 112 are mounted upon a mounting bracket 114 which is supported from machine frame 28 in a manner such that the lamp beam is inclined downwardly and inwardly toward the path traversed by the tips at an angle of approximately 20°. Energization of lamps 112 is controlled by a commercially available form of temperature sensor 116 mounted upon the machine frame to detect the temperature of tip elements 94 before they pass around sprocket 44 —, i.e., the temperature of the tip elements is sensed just after they move from the region covered by heating elements 112. The lamp control circuit is conventional and pin temperature is either increased or decreased by increasing the voltage to the lamps.

In the particular heat sealing operation under consideration, it is necessary to make sure that enough heat is supplied to the plastic base elements to completely melt the plastic to a degree sufficient to seal the vent openings, while at the same time avoiding the application of too much heat, which results in burning a hole completely through the plastic base element. Control of the quantity of heat applied to the base element during the sealing operation is achieved by heating the tip elements, as described above, to a given temperature range (about 500°–550°F), and concurrently controlling the period of time (about 1 second) over which the tip element is in contact with the plastic base. Control of this time period is accomplished by adjustable cam assembly 54, described in greater detail below.

ADJUSTABLE CAM

Figure 6:
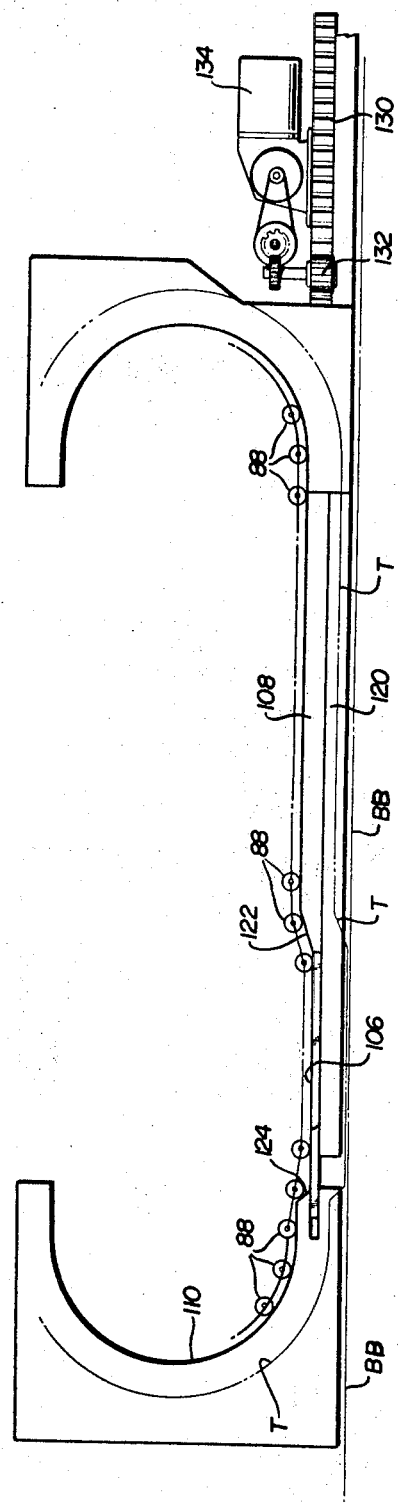
FIG. 6 is a partial side elevational view, showing details of the adjustable cam assembly.
Figure 8:
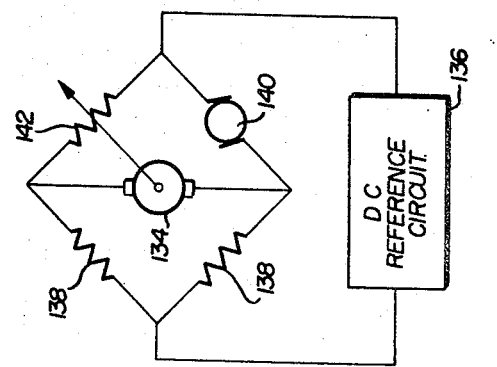
FIG. 8 is a schematic diagram of one form of automatic control for the adjustable cam assembly.
Figure 7:
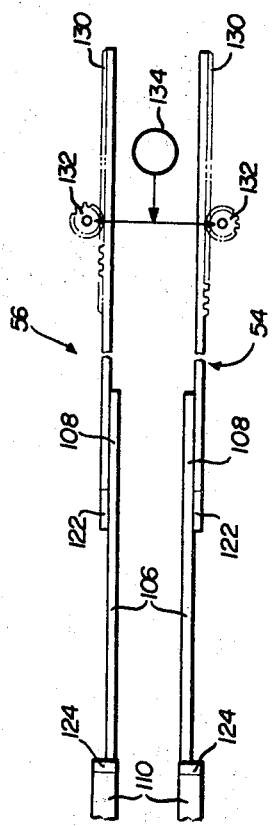
FIG. 7 is a partial top plan view of the adjustable cam assembly.

Adjustable cam assembly 54, 56 is shown in FIGS. 6 through 8, many adjacent parts of the base sealer being omitted for the sake of clarity. Referring first to FIG. 6, the fixed support track 106 is mounted upon a stationary machine frame member 120, while movable track members 108, which form part of the adjustable cam 54 are supported slidably upon member 120 for movement from right to left or vise versa as viewed in FIG. 6. At its left-hand end, track 108 is formed with an inclined toe section 122 which rises upwardly above the upper surface of fixed track 106. Curved roller track 110, which guides rollers 88 during their passage around end sprockets 44 terminates at a drop-off section 124, from which rollers 88 drop downwardly onto the upper surface of track 106. As the roller is conveyed to the right beyond dropoff 124 and along fixed track 106, it eventually reaches the inclined section 122 at the toe of adjustable track 108 and is elevated.

The path traversed by the base engaging portion 100 of tip elements 94 is indicated by the broken line T in FIG. 6, while the path of movement of the bottom of the base elements is indicated by the horizontal broken line BB of FIG. 6. It is seen that the path of the tip elements is coincident with the path of the base elements during that portion of movement of rollers 88 between dropoff 124 and the upwardly inclined toe 122 of adjustable track 108. It is during this portion of their paths that the tip element is maintained in contact with the base element to heat seal the vent openings.

As stated above, the purpose of the adjustable cam assembly is to establish a fixed time interval, regardless of line speed, during which the heated tip 94 is in contact with the base element to thereby assure sufficient heating action to melt the plastic to seal the base element vent openings, while at the same time avoiding burning a hole through the plastic base element. The time period of contact between the tip elements is maintained constant by shifting adjustable track 108 to the right or to the left as viewed in FIG. 6 in respective response to an increase or decrease in line speed. The term "line speed" refers to the speed at which the base and tip elements move along their respective paths. If, for example, a time period of contact between the tip and base element of 1 second is desired, then at a line speed of 2 feet per second, the distance between dropoff 124 and inclined section 122 is set at 2 feet. If the line speed should increase to 3 feet per second, then the 1-second time period of contact between the tip element and base element can be maintained by shifting track 108 to the right as viewed in FIG. 6 until its inclined section 122 is spaced at a distance of 3 feet from dropoff 124.

To provide for an automatic adjustment of the spacing between dropoff 124 and inclined portion 122 in response to a change in line speed, tracks 108, as best seen in FIG. 7, are formed with rack teeth sections 130. A pair of pinions 132 are respectively meshed with rack sections 130 and are concurrently driven in rotation by a reversible DC motor 134. The mechanical coupling between motor 134 and pinions 132 may take any of several conventional forms which is effective to simultaneously drive the respective pinions 132 in opposite directions of rotation so that the two tracks 108 are moved simultaneously either to the left or to the right as viewed in FIGS. 6 and 7.

One form of control circuit for motor 134 is indicated in FIG. 8. In this particular form of control circuit, a Wheatstone bridge connection is made with a suitable DC reference voltage source 136 connected across the bridge. Two fixed resistances 138 constitute two arms of the bridge, while a third arm of the bridge is connected across a DC generator 140. Generator 140 is mechanically driven at a speed proportional to line speed, as by a chain and sprocket connection to end sprockets 42, not shown, to produce a voltage opposing that available from source 136. Thus, a generator 140 acts, in the bridge circuit shown, as a variable resistance which is varied proportionately to line speed. Connected across the two center terminals of the bridge is DC motor 134. The resistance of the fourth arm of the bridge is a variable electrical resistance 142 in the form of a rotary potentiometer, the rotating shaft of which is mechanically positioned by motor 134. The shaft of potentiometer 142 may, for example, be connected to one of the shafts carrying pinion 132, for example, and thus the electrical resistance of that arm of the bridge containing potentiometer 142 is a resistance which is representative of the position of cam tracks 108.

Assuming an increase in line speed to occur, this increased speed will increase the voltage output of generator 140, thus in effect, increasing the electrical resistance of this particular arm of the bridge to the flow of current induced by the DC reference voltage source 136. This imbalance of the bridge will, in a well-known manner, cause a flow of current through motor 134 which is electrically and mechaincally connected to drive in a direction which will shift cam tracks 108 to the right as viewed in FIGS. 6 and 7. As motor 134 drives tracks 108, it simultaneously drives the shaft of potentiometer 142 in a direction which increases the resistance of that arm of the bridge in which potentiometer 142 is connected. Current will be supplied to motor 134 until the bridge becomes balanced —, i.e., when the resistance of potentiometer 142 reaches a resistance balancing that of the arm containing generator 140. At this time, the inclined sections 122 of cam tracks 108 will be spaced at the distance from dropoff 124 necessary to maintain the desired contact time.

While one embodiment of the invention has been disclosed, it will be apparent to those skilled in the art that the disclosed embodiment may be modified. Therefore, the foregoing description is to be considered exemplary rather then limiting, and the true scope of the invention is that defined in the following claims.

I claim:

1. The method of heat sealing articles of thermoplastic material as said articles are conveyed in continuous movement along a first path at speeds which may vary within a selected range of speeds comprising the steps of: heating a plurality of sealing members to a predetermined temeprature, moving each of said heated sealing members along a second path overlying said first path with said sealing members respectively in vertically aligned relationship with articles moving along said first path, lowering each heated sealing member into contact with its vertically aligned article as the article passes a first location on said first path and maintaining the member in contact with the article until the article reaches a second location on said first path, elevating the sealing member clear of the article when the article reaches said second location, and shifting said second location along said first path in response to variations in the speed of movement of said articles along said first path to maintain the time of contact between the sealing elements and articles constant throughout said selected range of speeds.

2. The method defined in claim 1 wherein the step of shifting said second location comprises the steps of supporting said sealing members upon a track for movement along said second path, the track having a dropoff at said first location to enable the sealing members to contact the articles, mounting a sealing member supporting cam having an inclined sealing member elevating section for sliding movement on said track toward and away from said dropoff, sliding said cam toward said dropoff in response to a decrease in the speed of articles along said first path and sliding said cam away from said dropoff in response to an increase in the speed of articles along said first path.

3. The method as defined in claim 2 further comprising the steps of said driving said cam in sliding movement by a reversible electric motor, varying a first variable electric resistance by operation of said motor, varying a second variable electric resistance in accordance with variations in speed of said articles along said first path, and connecting said motor and both of said resistances into a Wheatstone bridge circuit to position said cam in accordance with the speed of said articles along said first path.

* * * * *